US012482924B2

(12) United States Patent
Liu et al.

(10) Patent No.: US 12,482,924 B2
(45) Date of Patent: Nov. 25, 2025

(54) BASE STATION

(71) Applicant: Telefonaktiebolaget LM Ericsson (publ), Stockholm (SE)

(72) Inventors: Haitao Liu, Beijing (CN); Xuejun Sun, Beijing (CN); Liang Wang, Beijing (CN); Jianlan Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 18/020,963

(22) PCT Filed: Aug. 14, 2020

(86) PCT No.: PCT/CN2020/109309
§ 371 (c)(1),
(2) Date: Feb. 13, 2023

(87) PCT Pub. No.: WO2022/032664
PCT Pub. Date: Feb. 17, 2022

(65) Prior Publication Data

US 2023/0299468 A1 Sep. 21, 2023

(51) Int. Cl.
*H01Q 1/40* (2006.01)
*H01Q 1/02* (2006.01)
*H01Q 1/24* (2006.01)
*H01Q 5/378* (2015.01)
*H01Q 21/06* (2006.01)

(52) U.S. Cl.
CPC ............... *H01Q 1/246* (2013.01); *H01Q 1/02* (2013.01); *H01Q 21/061* (2013.01)

(58) Field of Classification Search
None
See application file for complete search history.

(56) References Cited

U.S. PATENT DOCUMENTS

2010/0314455 A1 12/2010 Kato et al.
2011/0090125 A1 4/2011 Minard et al.
2011/0228485 A1 * 9/2011 Usui .................. H05K 7/20509 361/720

(Continued)

FOREIGN PATENT DOCUMENTS

CN 107069179 A 8/2017
CN 107359398 A * 11/2017 ............... H01Q 1/38

(Continued)

OTHER PUBLICATIONS

Extended European Search Report for European Patent Application No. 20949162.0, mailed May 7, 2024, 15 pages.

(Continued)

*Primary Examiner* — Mohammed Rachedine
(74) *Attorney, Agent, or Firm* — Withrow & Terranova, PLLC

(57) ABSTRACT

The present disclosure provides a base station. It includes a radio board; at least one primary radiator disposed on the radio board; a multi-function block configured to protect and at least partly enclose the at least one primary radiator and the radio board; and at least one secondary radiator, located above the at least one primary radiator. At least a part of the multi-function block is located between the at least one primary radiator and the at least one secondary radiator.

13 Claims, 3 Drawing Sheets

(56) References Cited

U.S. PATENT DOCUMENTS

| | | | | |
|---|---|---|---|---|
| 2014/0118196 | A1* | 5/2014 | Koskiniemi ......... | H01Q 21/205 343/702 |
| 2016/0049723 | A1 | 2/2016 | Baks et al. | |
| 2019/0334232 | A1* | 10/2019 | Ha ........................... | H01Q 1/42 |
| 2019/0393619 | A1 | 12/2019 | Kim et al. | |
| 2021/0098863 | A1* | 4/2021 | Baek ........................ | H01Q 1/38 |

FOREIGN PATENT DOCUMENTS

| | | | | | |
|---|---|---|---|---|---|
| CN | 109509959 | A | * | 3/2019 | ............. H01Q 1/084 |
| CN | 110235306 | A | | 9/2019 | |
| CN | 210212032 | U | * | 3/2020 | |
| CN | 111525264 | A | | 8/2020 | |
| CN | 111525264 | B | * | 1/2022 | ............... H01Q 1/38 |
| KR | 20190088682 | A | | 7/2019 | |

OTHER PUBLICATIONS

Examination Report for Indian Patent Application No. 202347015758, mailed Jan. 22, 2025, 6 pages.

International Search Report and Written Opinion for International Patent Application No. PCT/CN2020/109309, mailed May 17, 2021, 8 pages.

Partial Supplementary European Search Report for European Patent Application No. 20949162.0, mailed Feb. 15, 2024, 15 pages.

* cited by examiner

BASE STATION

This application is a 35 U.S.C. § 371 national phase filing of International Application No. PCT/CN2020/109309, filed Aug. 14, 2020, the disclosure of which is incorporated herein by reference in its entirety.

TECHNICAL FIELD

The present disclosure generally relates to a technical field of communication industry, more particular to a base station used therein.

BACKGROUND

Currently, the base station includes at least an antenna and a radome which are separate from each other. The radome is only used to protect the antenna, for example covering or enclosing the antenna. Since we hope that the radome would not introduce any interference to radiation of the antenna, the radome is required to be relatively high, i.e., having a large space between the radome and the antenna. This arrangement includes two separate components, i.e., the antenna and radome to be separate, which causes the base station to be high or thick.

In fact, there is a trend to design a thin base station, and thus it is demanded to change the arrangement. Further, the radome in the arrangement would have to experience a serious deformation due to such large thickness and huge size. Therefore, the appearance of the base station is adversely affected and the RF performance of the base station becomes not so stable.

SUMMARY

In view of the foregoing, an object of the present disclosure is to overcome or at least mitigate at least one of above shortcomings in the prior art solution. Herein, the present disclosure provides a new type of the base station.

In accordance with one aspect of the present application, it provides a base station, comprising:

a radio board;

at least one primary radiator disposed on the radio board;

a multi-function block configured to protect and at least partly enclose the at least one primary radiator and the radio board;

at least one secondary radiator, located above the at least one primary radiator;

wherein at least a part of the multi-function block is located between the at least one primary radiator and the at least one secondary radiator.

In some embodiments, the at least one secondary radiator is located onto, in or within a body of the multi-function block.

In some embodiments, the at least one primary radiator comprises a plurality of primary radiators separately located on the radio board and the at least one secondary radiator comprises a plurality of secondary radiators separately disposed onto, in or within the multi-function block.

In some embodiments, the plurality of primary radiators are provided with the plurality of secondary radiators in a one to one corresponding relationship.

In some embodiments, the body of the multi-function block comprises a plurality of parallel posts protruding from a bottom surface of the body and each of the primary radiators is housed within a space between two adjacent ones of the posts.

In some embodiments, each of the posts is coupled with the radio board via an adhesive agent and/or a metal ground.

In some embodiments, the base station further includes a heatsink configured to support the radio board and fix with the multi-function block by a buckle joint, a/the adhesive agent or a screw.

In some embodiments, the multi-function block is provided with at least one protrusion, and the heatsink is provided with at least one recess, wherein the at least one protrusion is matched with the at least one recess.

In some embodiments, the primary radiators and the secondary radiators are respectively arranged in a form of an array.

In some embodiments, the secondary radiators and the primary radiators both are in a round, square or a pentagon shape and respectively made by metal or a printed conducting ink.

In some embodiments, a reinforcing metal net is provided in the body of the multi-function block and configured to divide the body into a plurality of regions, each of the regions is provided with one of the secondary radiators.

In some embodiments, a metal sheet is provided at a crossing point of the reinforcing metal net.

In some embodiments, a support member is provided within the space between the bottom surface of the multi-function block and a facing surface of the primary radiator.

In some embodiments, the at least one primary radiator is connected with the at least one secondary radiator with a conducting pole.

BRIEF DESCRIPTION OF THE DRAWINGS

These aspects and/or other aspects as well as advantages of the present application will become obvious and readily understood from the description of the preferred embodiments of the present application in conjunction with the accompanying drawings below, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details.

Furthermore, in some instances detailed descriptions of well-known methods, structures, and devices are omitted so as not to obscure the description with unnecessary detail.

Embodiments of the present disclosure provide base stations used in the communication industry. Structures and locations of an antenna and a multi-function block used by the base station are improved to provide a base station having a low profile.

Figure 1A:
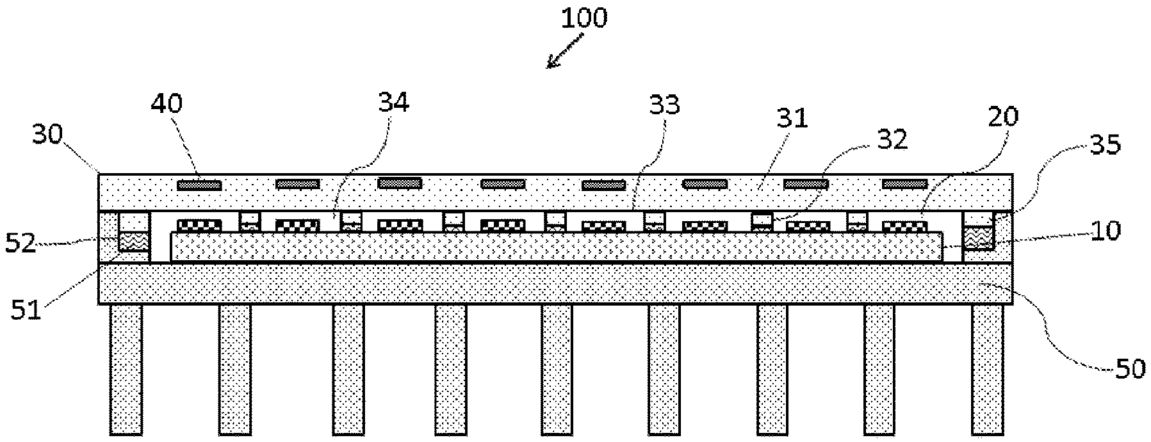
FIG. 1A is a schematic view of a base station in accordance with an embodiment of the present invention where the second radiators are located within a body of a multi-function block.
Figure 1B:
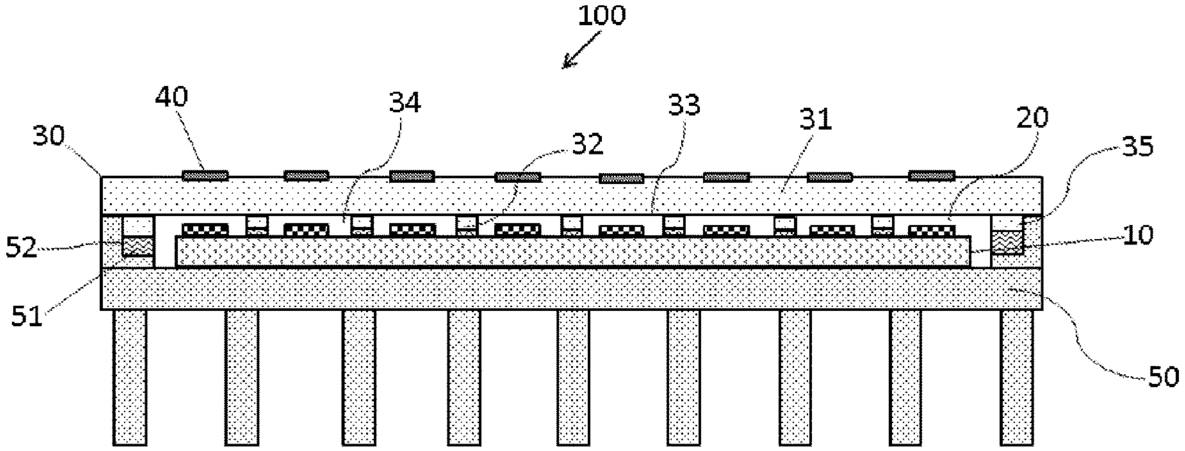
FIG. 1B is a schematic view of a base station in accordance with an embodiment of the present invention where the second radiators are located in a body of a multi-function block.
Figure 1C:
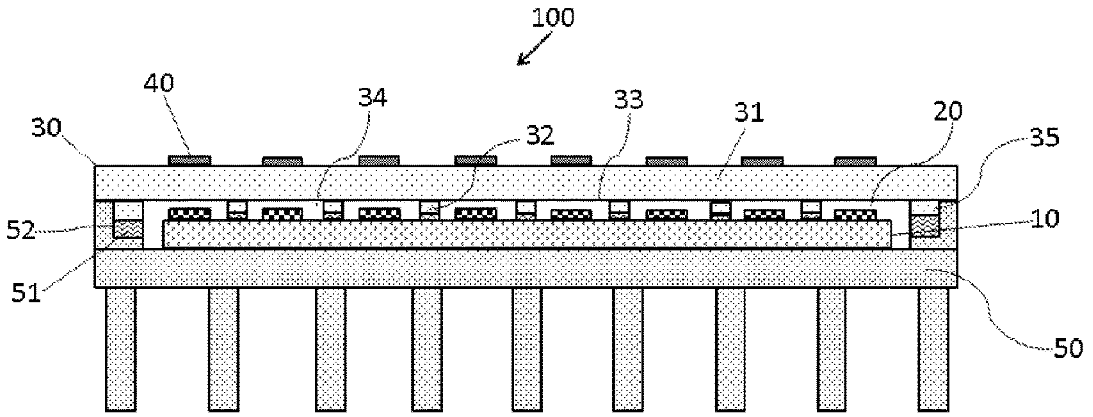
FIG. 1C is a schematic view of a base station in accordance with an embodiment of the present invention where the second radiators are located onto a body of a multi-function block.

As shown in FIGS. 1A, 1B and 1C, it provides a base station 100 including a radio board 10, at least one primary radiator 20, a multi-function block 30 and at least one secondary radiator 40. Further, the base station 100 also includes a heatsink 50 disposed beneath all the above described components.

Specifically, the at least one primary radiator 20 is disposed on the radio board 10. In an example, the at least one primary radiator 20 is placed on a facing surface of the radio board 10 which faces toward the multi-function block 30. The multi-function block 30 functions to protect antenna elements such as the primary radiator 20. In an example, the multi-function block 30 is arranged to locate above the primary radiator 20 and the radio board 10 so as to at least partly enclose or surround them.

The multi-function block 30 herein can be used to provide the least one of the following functions: to provide environment protection for the base station 10, to support the at least one secondary radiator 20 and to help reduce the thickness of the base station 100. The environment protection includes waterproof protection and providing features for adapting to windward side design.

The at least one secondary radiator 40 is located above the at least one primary radiator 20. At least a part of the multi-function block 30 is provided between the at least one primary radiator 20 and the at least one secondary radiator 40.

As compared to the arrangement having the secondary radiator on a bottom surface of the multi-function block or below the multi-function block, a volume of the base station is reduced. In other words, the multi-function block is placed within a space which should be occupied by the antenna's radiation elements, i.e., the multi-function block is at least partly provided between radiating segments of the antenna, in particular the at least one primary radiator 20 and the at least one secondary radiator 40.

The height or space required by the multi-function block in the traditional design can be at least eliminated to a certain degree. For example, under almost the same conditions (except the change on the structures and location of the multi-function block and the secondary radiators), the height of the base station in the present invention can be reduced by a half or more than a half, with respect to that of the traditional base station.

It should be understood that the at least one primary radiator 20 and the at least one secondary radiator 40 can include any number of the primary radiators and the secondary radiators, as desired. The present invention does not make any limitation on this. The primary radiator can also be called as a main radiator, and the secondary radiator can also be called as a parasitic radiator.

Referring to FIG. 1A, it shows the at least one secondary radiator 40 located within a body 31 of the multi-function block 30. Alternatively the at least one secondary radiator 40 can also be provided onto or in the body 31. It should be understood that the term "A within B" means A completely embedded in B, as shown in 1A, the term "A in B" means a part of A embedded in B, and the remaining of A outside B, as shown in FIG. 1B; and the term "A onto B" means a part of A provided on a surface of B, as shown in FIG. 1C.

Although the arrangement shown in FIG. 1A is taken as an example, it should be understood that the arrangements shown in FIGS. 1B and 1C can also be applicable and so the explanations about them are omitted herein.

For example, the secondary radiator 40 is placed in or within a recess of the body 31, or the secondary radiator 40 is placed on a part of the body 31 and then a waterproof layer is coated on it so as to be located within or in the body 31. It should be noted that the ways of achieving such arrangement are not limited herein as long as it can form the arrangement having the multi-function block between the primary radiator and the secondary radiator. Further, the distance of the secondary radiator 40 from an upper surface or a lower surface of the body 31 can be set as actually needed.

Figure 2:
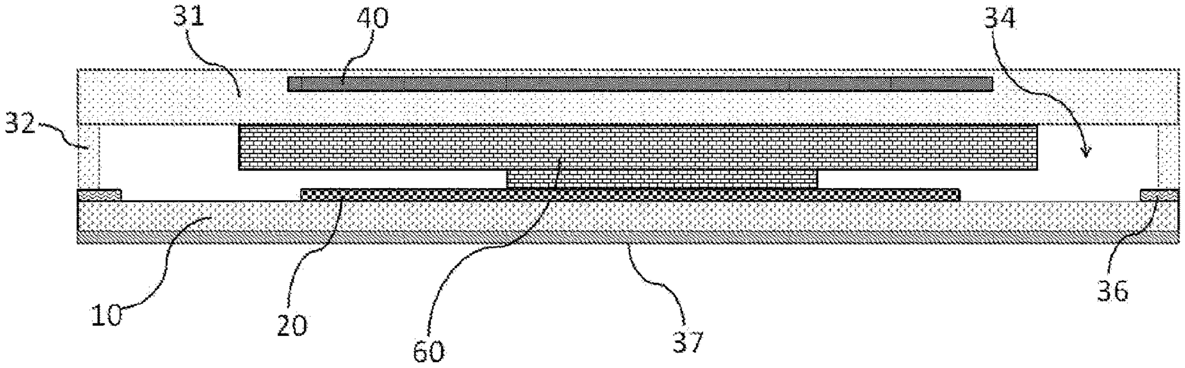
FIG. 2 is a schematic view of a unit of the base station as shown in FIG. 1A.
Figure 3:
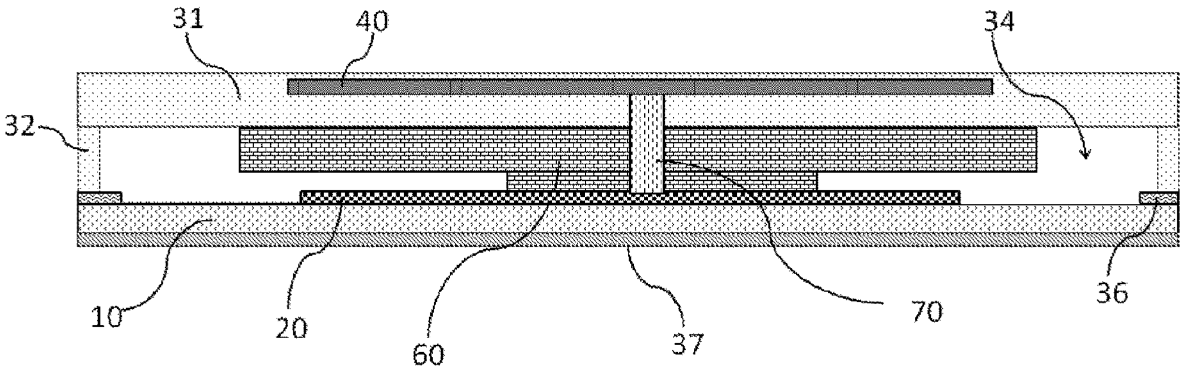
FIG. 3 is a schematic view of a variant of a unit of the base station as shown in FIG. 1A.

In an example, the at least one primary radiator 20 includes a plurality of primary radiators separately located on the radio board 10. The at least one secondary radiator 40 includes a plurality of secondary radiators separately disposed onto, in or within the multi-function block 30. Typically, the plurality of primary radiators 20 are provided with the plurality of secondary radiators 40 in a one to one corresponding relationship. In this way, one of the primary radiator 20 and a corresponding one of the secondary radiator 40 constitute a unit of the base station 100, which is shown in FIGS. 2 and 3 and would be discussed later.

That is, FIGS. 1A, 1B and 1C respectively show 8 units of the base station. It should be understood that the base station can include any number of the units.

The body 31 of the multi-function block 30 includes a plurality of parallel posts 32 protruding from a bottom surface 33 of the body 31 and each of the primary radiators 20 is housed within a space 34 between two adjacent ones of the posts 32. As shown, the part between two adjacent posts 32, a part of the radio board 10 and/or a part of the heatsink delimit the space 34. The primary radiator 20 is located on the surface of the radio board 10, and the secondary radiator 40 on, in or within the body 31 directly or almost directly faces the corresponding primary radiator 20.

Each of the posts 32 is coupled with the radio board 10 via an adhesive agent 51, and this is used to mitigate the deformation of the multi-function block 30. Further, in order to enhance the effect of mitigating the deformation of the multi-function block 30, the body 31 can be processed with a pre-deformation process so that the body 31 becomes very slightly arc-shaped.

Alternatively, each of the posts 32 is coupled with the radio board 10 via a metal ground 36 as shown in FIGS. 2 and 3.

With reference back to FIG. 1, the heatsink 50 is used to support the radio board 10, so it is located substantially beneath the radio board 10. The heatsink 50 and the multi-function block 30 can be fixed together by a buckle joint, an adhesive agent (for example glue) 51 or a screw.

In order to be assembled together, the multi-function block 30 is provided with at least one protrusion 35 and the heatsink is provided with at least one recess 52. As shown, two protrusions 35 are respectively provided at two ends of the body 31. Accordingly, two recesses 52 are respectively provided at two ends of the heatsink 50. The two protrusions 35 are matched with the two recesses 52.

In an example, the glue 51 is placed in the recess 52 first and then the protrusion 35 is inserted into the corresponding recess 52, so that they are fixed by the glue 51. Other fixing methods are similar in principle so that they are not discussed again.

Figure 4:
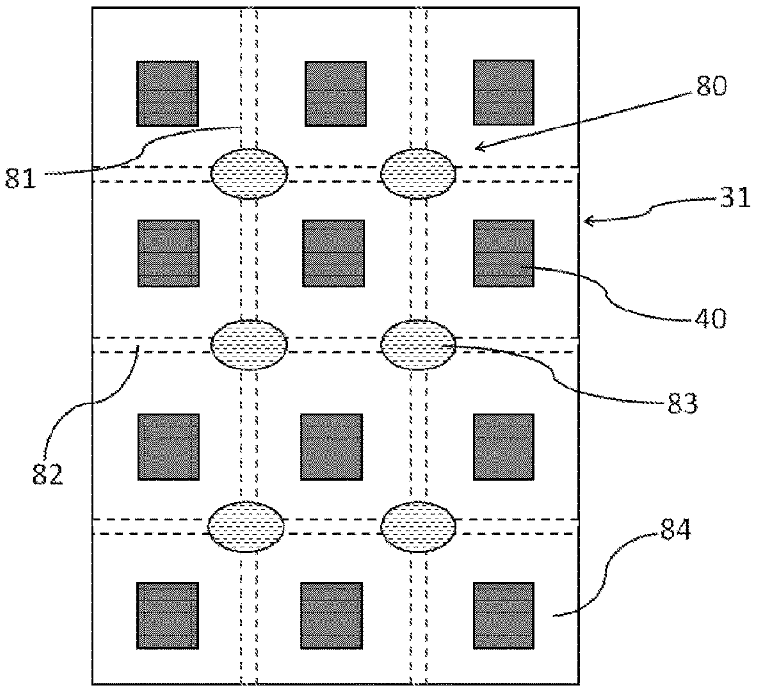
FIG. 4 is a partially plan view of the secondary radiator and the multi-function block as shown in FIG. 1A.

In combination with FIG. 4, the at least one primary radiators 20 and the secondary radiators 40 are respectively arranged in a form of an array. It should be noted that the primary radiators 20 and the secondary radiators 40 can also be arranged in any other pattern.

Both of them can be in a round, square, a pentagon shape or any suitable shape. The secondary radiators 40 can be made of any metal or PCB based or printed conducting ink or other conductive materials. The primary radiators 20 can be made of the same materials as that of the secondary radiators 40 or a different material from that of the secondary radiators 40. Alternatively, it is optimal to select some materials having high thermal conductivity and transparent to the electromagnetic wave for making the primary radiators 20 and the secondary radiators 40. The size and shape are typically determined by the RF performance, such as S-parameter and radiation patterns.

As shown in FIG. 2, it shows a unit of the present base station. The arrangement is similar to that shown in FIG. 1A but with the addition of a support member 60. The support member 60 is provided within the space 34 contained within each unit, between the bottom surface of the body 31 and a facing surface of the primary radiator 20. The support member 60 can have any desired shape or size, and can be an integrated member or two pieces. As shown, the support member 60 has an upper part and a lower part below it. The upper part has a larger area than that of the lower part, and both of them can be circular, square or of any other suitable shape. It should be understood that the support member 60 is not limited to as shown, and can be design in any form as long as it can support the body 31.

Two posts 32 at the two ends of the unit are connected with the respective metal grounds 36 on the radio board 10.

In addition, a RF GND 37 for the antenna is provided onto a bottom surface or a lower surface of the radio board 10.

As shown in FIG. 3, the unit has the arrangement most similar to that shown in FIG. 2. It is clear that the unit of FIG. 3 further includes a conducting pole 70 which is used to connect the primary radiator 20 and the secondary radiator 40 within the same space 34. The conducting pole 70 is made of any suitable metal like copper, gold or the like, and alternatively is made of other materials with high thermal conductivity. The primary radiator 20 is the main radiator of the antenna, which is fed by a radio-mother-board 10.

With the provision of the conducting pole 70, the secondary radiator 40 and the primary radiator 20 can be considered to be one radiator when only a DC current is passing through. When AC current is passing through, they can function as the main radiator and the parasitic radiator respectively.

With reference to FIG. 4, it shows a variant of the secondary radiator and the multi-function block in accordance with another embodiment of the present invention. A reinforcing metal net 80 is provided in the body 31 of the multi-function block 30, and divides the body 31 into a plurality of regions 84. Each of the regions 84 is provided with one of the secondary radiators 40. That is, each region 84 corresponds to one of the spaces 34 or one unit of the base station 100. The reinforcing metal net 80 includes a plurality of parallel column bars 81 and a plurality of parallel line bars 82. They interlaced with each other and a metal sheet 83 is provided a crossing point of the reinforcing metal net 80. The metal sheet 83 is used to enhance the structure strength and can be circular, oval or any other shape.

In the present invention, the multi-function block and the secondary radiators are integrated into the volume which should be occupied by the antenna radiators. In this way, the multi-function block would not occupy additional space and not result in the height of the base station too high.

Further, the provision of the posts 32 and the use of the pre-deformation process ensure the body 31 to counteract the deformation, so that the multi-function block 30 in the present invention would have less deformation than those in the conventional design.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A base station, comprising:

a radio board;

at least one primary radiator disposed on the radio board;

a multi-function block configured to protect and at least partly enclose the at least one primary radiator and the radio board; and at least one secondary radiator, located above the at least one primary radiator;

wherein at least a part of the multi-function block is located between the at least one primary radiator and the at least one secondary radiator, wherein the at least one primary radiator is connected with the at least one secondary radiator with a conducting pole in the middle of the at least one primary radiator and the at least one secondary radiator.

2. The base station according to claim 1, wherein the at least one secondary radiator is located onto, in or within a body of the multi-function block.

3. The base station according to claim 2, wherein the at least one primary radiator comprises a plurality of primary radiators separately located on the radio board and the at least one secondary radiator comprises a plurality of secondary radiators separately disposed onto, in or within the multi-function block.

4. The base station according to claim 3, wherein the plurality of primary radiators are provided with the plurality of secondary radiators in a one to one corresponding relationship.

5. The based station according to claim 4, wherein the body of the multi-function block comprises a plurality of parallel posts protruding from a bottom surface of the body and each of the primary radiators is housed within a space between two adjacent ones of the posts.

6. The base station according to claim 5, wherein each of the posts is coupled with the radio board via an adhesive agent and/or a metal ground.

7. The base station according to claim 1, further comprising a heatsink configured to support the radio board and fix with the multi-function block by a buckle joint, a/the adhesive agent or a screw.

8. The base station according to claim 7, wherein the multi-function block is provided with at least one protrusion, and the heatsink is provided with at least one recess, wherein the at least one protrusion is matched with the at least one recess.

9. The base station according to claim 1, wherein the primary radiators and the secondary radiators are respectively arranged in a form of an array.

10. The base station according to claim 1, wherein the secondary radiators and the primary radiators both are in a round, square or a pentagon shape and respectively made by metal or a printed conducting ink.

11. The base station according to claim 1, wherein a reinforcing metal net is provided in the body of the multi-function block and configured to divide the body into a plurality of regions, each of the regions is provided with one of the secondary radiators.

12. The base station according to claim 11, wherein a metal sheet is provided at a crossing point of the reinforcing metal net.

13. The base station according to claim 1, wherein a support member is provided within the space between the bottom surface of the multi-function block and a facing surface of the primary radiator.

* * * * *